Figure 5:
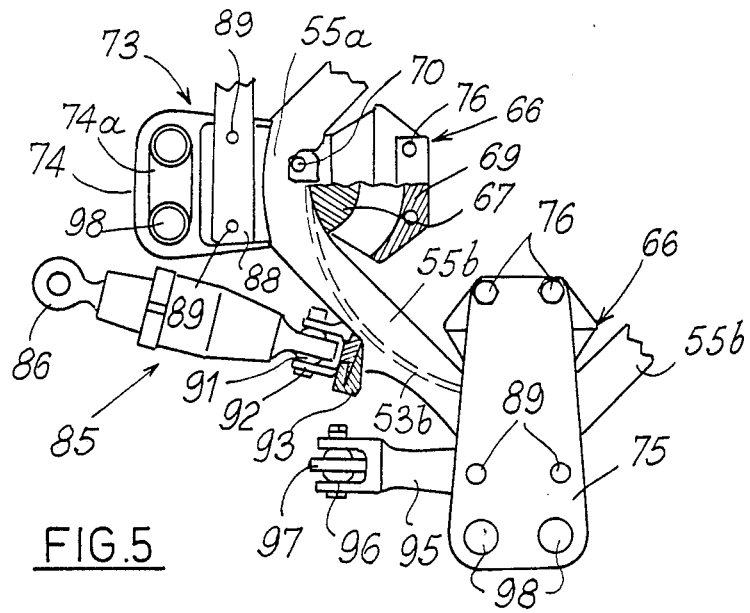

United States Patent [19]

Mouille et al.

[11] Patent Number: 4,732,540
[45] Date of Patent: Mar. 22, 1988

[54] INTEGRATED HUB-MAST AND GYROPLANE ROTOR HEAD COMPRISING IT

[75] Inventors: Rene L. Mouille, Aix-en-Provence; Bruno Guimbal, Chateauneuf-les-Martigues, both of France

[73] Assignee: Aerospatiale Societe Nationale Industrielle, Paris, France

[21] Appl. No.: 886,278

[22] Filed: Jul. 16, 1986

[30] Foreign Application Priority Data

Jul. 22, 1985 [FR] France .................................. 85 11159

[51] Int. Cl.$^4$ ............................................. B64C 27/38
[52] U.S. Cl. .................................. 416/140; 416/134 A
[58] Field of Search .......... 416/134 A, 138 A, 140 A, 416/141, 170 B

[56] References Cited

U.S. PATENT DOCUMENTS

| | | |
|---|---|---|
| 3,322,200 | 5/1967 | Tresch . |
| 4,028,001 | 6/1977 | Watson ............................ 416/134 A |
| 4,249,862 | 2/1981 | Waddington et al. ...... 416/140 A X |
| 4,297,078 | 10/1981 | Martin ............................ 416/141 X |
| 4,375,940 | 3/1983 | Lovera et al. ............... 416/170 B X |
| 4,407,633 | 10/1983 | Monille ......................... 416/140 A |
| 4,512,717 | 4/1985 | Pancotti et al. ............... 416/134 A |
| 4,516,909 | 5/1985 | Caramaschi et al. ........... 416/134 A |

FOREIGN PATENT DOCUMENTS

| | | |
|---|---|---|
| 2192942 | 2/1974 | France . |
| 2456034 | 12/1980 | France . |
| 2457804 | 12/1980 | France . |
| 2427251 | 1/1983 | France . |
| 2516891 | 2/1984 | France . |
| 2136377 | 9/1984 | United Kingdom . |

Primary Examiner—Everette A. Powell, Jr.
Attorney, Agent, or Firm—Armstrong, Nikaido, Marmelstein & Kubovcik

[57] ABSTRACT

The integrated hub-mast (1) of the invention is composed of a tubular single piece body whose hub body forming part (3) is integral, on the side of its end end opposite the mast (2), with a reinforcing ring (5) and in which openings (6) are pierced. For each blade of the rotor, a stratified spherical stop (16) is fixed against the ring (5) and is retained in the hub body (3) and this stop (16) is also fixed to the ends integral to the hub body (3) of the lower (24) and upper (25) branches of a forked fastening part (23) connecting the blade (22) to the stop (16), the lower branch (24) passing through an opening (6) in the hub (3). A central flapping stop (30) is mounted on a support (31), in the hub-mast (1), which carries external fastenings for coupling to the resilient drag return and damping members of the blade.

25 Claims, 7 Drawing Figures

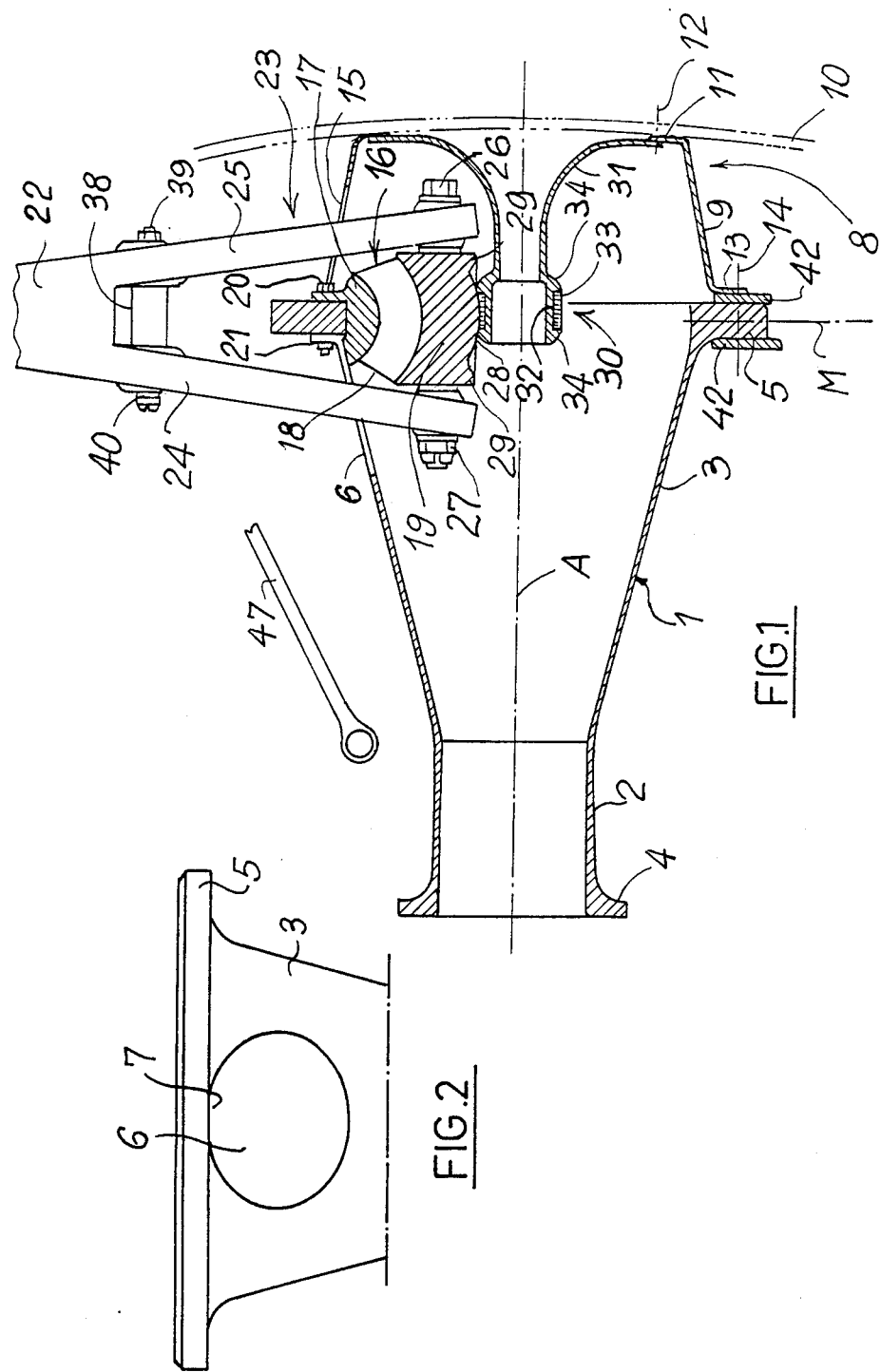

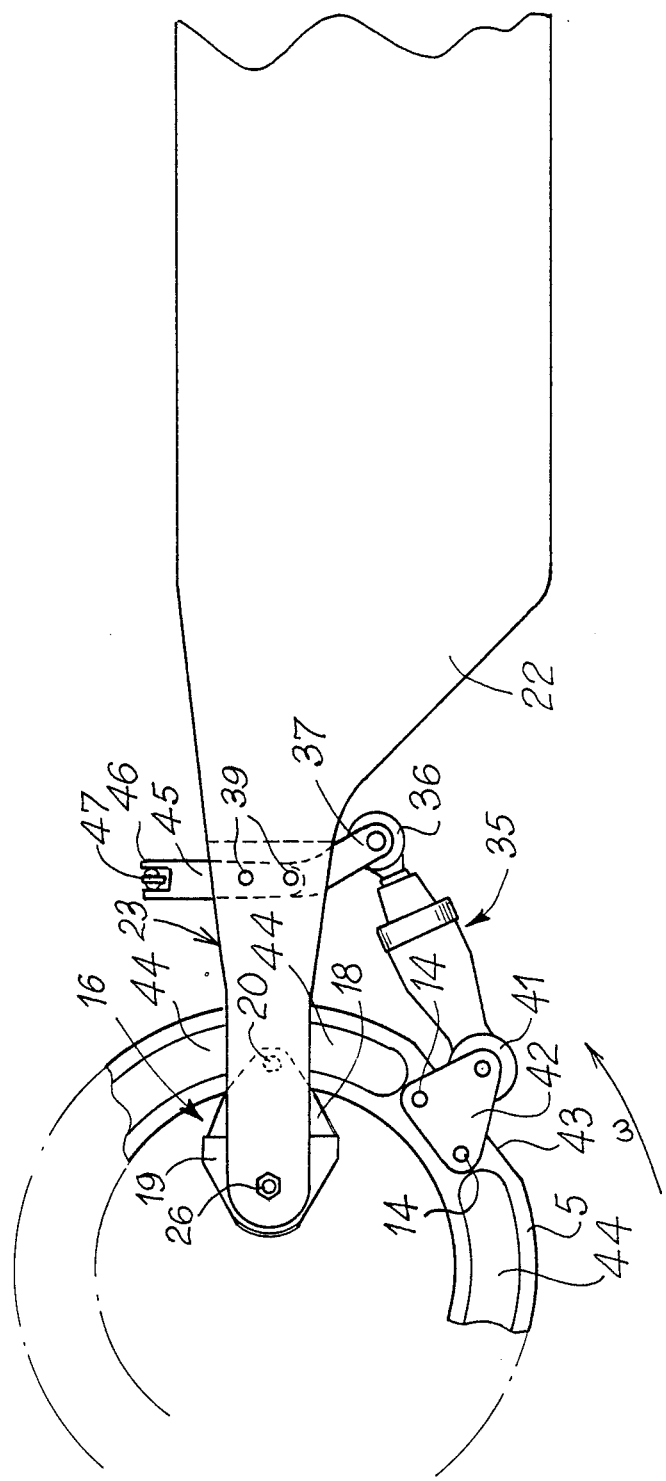

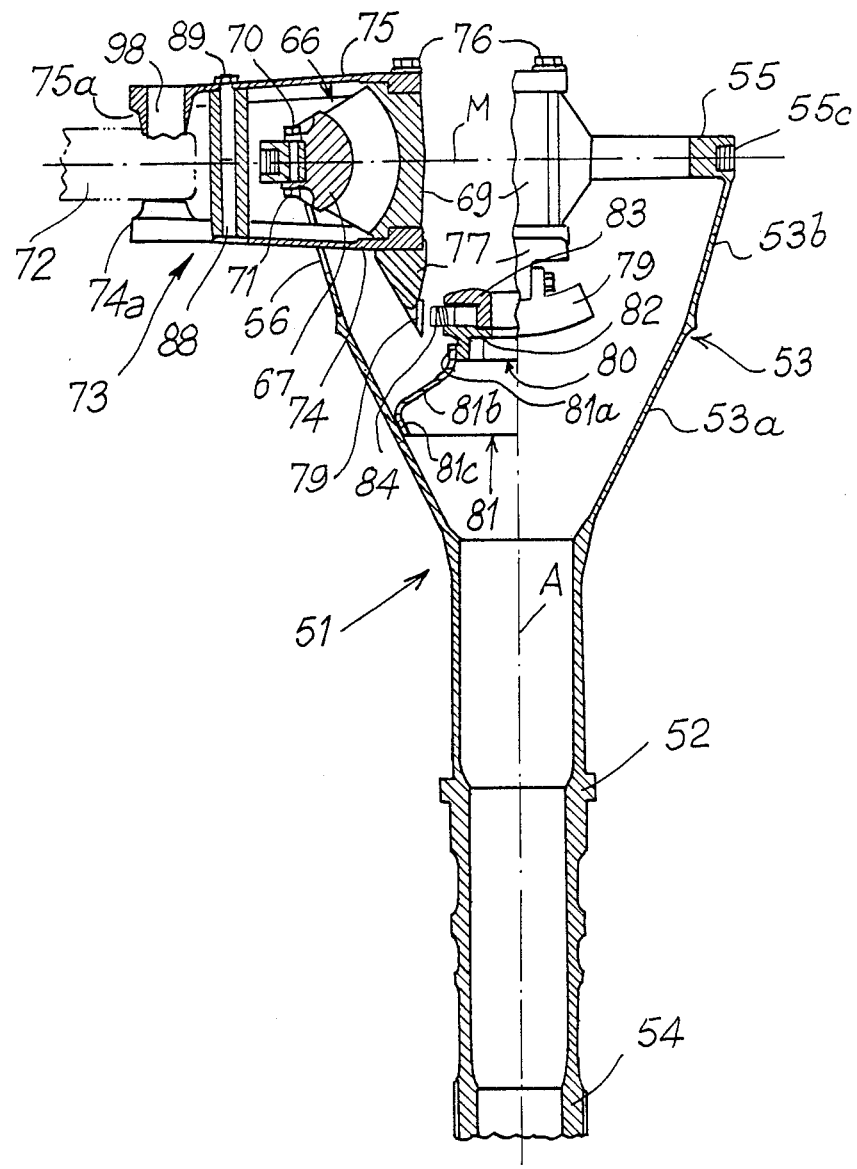

INTEGRATED HUB-MAST AND GYROPLANE ROTOR HEAD COMPRISING IT

The present invention relates to gyroplane rotors and relates more particularly to an integrated hub-mast as well a rotor head comprising this integrated hub-mast and intended in particular for equipping helicopters.

In the French patent No. 2 427 251 and its first certificate of addition No. 2 456 034, as well as in the French patent application No. 81 22027, main rotor or rear rotor heads for helicopters have been described which comprise a mast and a hub body able to be integrated in the form of a single piece block made from a metal or composite material.

The helicopter rotors described in these documents each comprise a rigid central hub body, to which the root of each blade of the rotor is coupled through a spherical stratified stop and a drag damper, or by means of a resilient return drag strut with incorporated damping.

The stratified spherical stop which forms an articulation allowing movement of the corresponding blade about three flapping, drag and angle of attack pitch control axes, comprises a central stratified part formed of an alternating stack of spherical skull caps of a rigid material and of a resilient material working under compression and shearing between an external frame integral with the hub and an internal frame fixed to a connection to the blade.

The drag damper, which may be hydraulic but which is preferably formed of an alternating stack of rigid plates and plates made of a visco-elastic material or coaxial tubes between which is incorporated a cylindrical sleeve made from a visco-elastic material, has its ends coupled by ball and socket joints to the root of the corresponding blade and at a point of the hub so that, for the angular drag movements of the blade, it ensures energetic resilient return to the neutral axis while simultaneously introducing a certain damping of these movements.

In French patent No. 2 427 251, the central body of the hub has the form of a plate or flat ring, with convex polygonal or substantially circular periphery, extending substantially radially with respect to the axis of rotation of the rotor, which merges with the axis of the rotor mast supporting the hub, and this plate has as many openings in the direction of the axis of the rotor as the rotor has blades. A spherical stratified stop is mounted bearing by its external frame against the outer edge of each opening whereas its internal frame is fixed to the internal ends of the branches of a forked piece integral with the root of the corresponding blade, and the point of the periphery of the hub, to which the corresponding drag damper is coupled by means of a ball and socket joint, is situated between the corresponding spherical stratified stop and that of the immediately preceding or following corresponding blade, in the direction of rotation of the rotor. In addition, a lever controlling the angle of attack of the corresponding blade is fixed to the forked piece, on the side opposite the corresponding drag damper and, finally, in the case of a main rotor, the lower branch of the forked piece carries, under its internal end, a stop limiting the downward flapping of the corresponding blade, by cooperating with a reciprocal ring mounted for sliding radially about the rotor mast, below the hub, so that its stop comes to bear against the reciprocal ring at slow rotational speeds of the rotor and when the rotor is stopped.

The forked piece may be formed by an extension of the root of the corresponding blade, or else by a radial clevis at the internal end of an added member for connection to the root of the corresponding blade, the two branches of this internal end clevis or of this extension being fixed to the internal frame of the corresponding stratified spherical stop by means of two bolts. In the case of using an added member for connection to the root of the blade, this member also has, at its external end, another clevis by which it is fixed to the root of the corresponding blade by means of two shafts substantially perpendicular to the plane of the rotor, and one of which is removable for allowing the blade to be folded back into the plane of the rotor by pivoting about the other shaft.

So as to integrate, if required, in the rotor a device for automatically folding back the blades, it has been proposed that this added connection member be in the shape of a sleeve, whose cylindrical part allows this device to be housed and which also serves for fixing the lever controlling the angle of attack of the corresponding blade, the corresponding drag damper and the lower stop cooperating with the reciprocal ring.

For overcoming all the potential problems which result from a bolted connection of the hub to the rotor mast, such as corrosion under tension or unclamping of the bolts, the central body of the hub and the mast may be integrated, and it has been proposed that the rigid central body of the hub form with the mast of the rotor a single block metal piece, made for example from steel or titanium and being integrally forged or die stamped. However, in order to reduce the vulnerability, the mass and the cost of such an integrated hub-mast, this latter may be made from composite materials, by stacking or draping folds of fabrics made from synthetic or mineral fibers with high mechanical strength which are preimpregnated and agglomerated by means of a synthetic resin which is subsequently cured and hardened. In this latter case, so as to give a good "fail-safe" character to the integrated hub-mast, a girdle of composite structure is advantageously wound about the hub plate.

The rotors described in the first certificate of addition No. 2 456 034 to the French patent mentioned above, are essentially distinguished from those which form the subject of this parent patent by the fact that their hub body comprises a central strut, extending the mast of the rotor, and carrying an upper plate and a lower plate, the external frame of each spherical stratified stop being embedded between and fixed directly to the edges of the two plates, in the manner of a rigid spacer, and the root of the corresponding blade being joined to the internal frame of the stratified spherical stop by means of a radial clevis recessed for the free passage of the spherical stop. In addition, it has been proposed in this certificate of addition that the whole of the hub, particularly its strut and its two plates, form, with the upper part of the rotor mast, a single block piece, made for example from integrally forged or die stamped metal. By analogy with the developments proposed of the rotors described in the parent patent, it may be contemplated providing, for equipping rotors according to the above mentioned certificate of addition, an integrated hub-mast with two substantially radial plates and having a composite structure. It should be noted that such a construction, in the sense of reducing the number of parts and suppressing the connections, would go far beyond the rotor constructions described in French patent application No. 2 529 860, which comprise two plates made from composite materials fixed to a metal spacer which separates them and, on the upper part of the metal rotor-mast by bolts, in a basic architecture identical to that of the rotors described in French patent application No. 81 22027 and being essentially distinguished from the rotors of the above mentioned certificate of addition by the fact that the root of each blade has a loop which directly surrounds the corresponding stratified spherical stop and is fixed to the internal frame thereof.

However, the manufacture of the hub and of the mast of the rotors described in all the documents mentioned above in the form of an integrated hub-mast, still proves delicate, difficult and expensive, whether this single block piece is made from metal or from composite materials, and whether it has a single radial recessed plate or two radial plates without recesses. In fact, the integrated hub-mast must have, on the side opposite its foot by which it is driven in rotation, one or two portions widened out in the shape of a corolla, forming the hub plate or plates. In a metal construction, the die stamping of this or these corolla shaped parts is a relatively simple operation. On the other hand, the construction of such a part made from a composite material is very difficult for it is, in use, very highly loaded under flexion and shearing and, in addition, its concave or double concave shape also makes manufacture thereof complex, whatever the process used. In particular, the construction of a part widened out in the shape of a corolla for forming a hub plate raises numerous problems, particularly in so far as the variations of thickness are concerned between the part forming the mast and the part forming the hub plate, which must be obtained while simultaneously ensuring changes of about 90° in the orientation of the high mechanical strength fibers, and the stacking or fabrics in this double evolutive zone (having curvatures in two substantially perpendicular directions), which raise a problem related to the expansion of the fabrics.

The present invention proposes overcoming these major drawbacks and the invention provides an integrated hub-mast having both a simplified and lighter structure and improved safety and reliability, which may be made from metal or from a composite material in a simpler, more economical and more reliable way.

The invention therefore relates to an integrated hub-mast whose mass is smaller and whose lifespan is increased and maintenance simplified, which lowers the direct operating costs.

The invention relates further to an integrated hub-mast, of small dimensions, so with smaller aerodynamic drag and whose simplified structure, because of the reduction of the number of connections and so of the parts which it comprises, lowers the vulnerability of the rotor head which is equipped with it, because it provides an increased protection of the essential components, such as the members for retaining and pivotally mounting the blades on the hub, which comprise, for each blade, at least one stratified stop, for example a spherical stop, and the members of a device with flapping stops.

The integrated hub-mast of the invention, of a type comprising a tubular part forming a mast, one end of which is shaped as a foot by which the hub-mast is intended to be rotated about the axis of the mast-forming part, which is integral, on the side opposite the foot, with a part forming a hub body, coaxial with the mast and intended to be connected, through retention and pivoting means, to rotor blades each having a forked two branch fastening part, is characterized in that the hub body is also a tubular part which extends the mast and widens out from its end portion by which it is joined to the mast to its opposite end portion, with which it is firmly joined to a reinforcing ring, the hub body being pierced with openings in number equal to the number of blades and evenly spaced apart in the circumferential direction on the periphery of the hub body, between the mast and the reinforcing ring intended to take up the centrifugal forces introduced into the hub-mast by the retaining and pivoting members intended to be housed inside the hub body and to bear against the internal face of this latter, at the level of the reinforcing ring, while being connected to the forked fastening parts of the blades, one branch of each of which is intended to pass through a corresponding opening in the hub body.

The general form of such an integrated hub-mast, which is well adapted to a metal construction, is in addition better adapted to a construction using composite materials than the forms known in the state of the art, for in this latter case it allows these composite materials to be acted upon and to work in the direction of the fibers, while minimizing the induced shearing, because of the nature of the forces received at the level of the hub body forming part and transmitted by the hub-mast to the foot of the mast-forming part. These forces are centrifugal forces which are exerted on the blades of the rotor as well as flapping forces and drag forces of the blades, which induce respectively a moment and a torque which the hub-mast transmits to its foot by a much more direct path than in the integrated hub-mast constructions of the prior art.

Preferably, the openings in the hub body are identical with each other and have substantially a half moon or haricot bean shape, with its concavity turned towards the reinforcing ring, the ends in the circumferential direction of the openings being located substantially in the same transverse plane perpendicular to the axis of the hub-mast.

In one advantageous embodiment, which facilitates the manufacture of the hub-mast, the reinforcing ring and the hub body are formed by a single block piece on which the reinforcing ring is formed by a local and peripheral increase of thickness of the hub-mast. But it is also possible for the reinforcing ring to be formed of a strap made from metal or from composite materials, fixed to the inner face or to the outer face of the tubular hub body.

So as to give the hub-mast good "fail-safe" characteristics and so as to ensure the redundancy required in the case of breakage of the hub body, following a crack, in the case of a metal construction, or a ballistic impact, the hub body is advantageously girdled with a composite material strap and, for this, the reinforcing ring advantageously has a peripheral housing opening radially outwardly and in which is housed a composite material girdle, having unidirectional synthetic or mineral fibers with high mechanical strength, wound and agglomerated by means of a hardened synthetic resin.

In a first embodiment, whose structure is simplified, the reinforcing ring is a circular ring projecting radially outwardly of the hub body. In this case, it is particularly advantageous for further simplifying the manufacture, for the hub body and the mast to be formed by a single tubular piece with symmetry of revolution.

But it is also possible, in particular so that the hub body has excellent rigidity, allowing it to accomodate the centrifugal force coming from the blades of a main rotor equipped with such a hub-mast, for the reinforcing ring to have a substantially polygonal shape and to project radially on the one hand towards the outside of the hub body, substantially at the level of the portions of the reinforcement ring situated axially opposite the openings in the hub body and, on the other hand, towards the inside of the hub body, substantially at the level of the portions of the reinforcing ring situated axially between two adjacent openings of the hub body.

For equipping a rear rotor, the integrated hub-mast may be such that its mast, its hub body and its reinforcing ring are made from metal, the reinforcing ring having for example a cross section substantially in the form of a rectangular quadrilateral and not being surrounded by a composite material girdle. Such a hub-mast may be readily made from steel or titanium, from a die stamped or forged blank.

On the other hand, for equipping a main rotor, if the mast, the hub body and the reinforcing ring are made from metal, it is particularly necessary to surround the ring with a composite material girdle, for the above mentioned reasons, but it is also possible to form the mast and the hub body from a composite material having high mechanical strength fibers agglomerated by means of a hardened synthetic resin, or by winding carbon or KEVLAR (registered trademark) rovings preimpregnated with an epoxy resin which is then cured and hardened, or by draping carbon or KEVLAR fiber fabrics preimpregnated with epoxy resin, then molding under pressure and hot curing of the resin, the openings being subsequently formed in the hub-mast. In these latter cases, the reinforcing ring may be made from metal and surrounded by a composite material girdle, but it is clearly advantageous for the ring to be integrally formed from composite materials with unidirectional synthetic or mineral fibers having high mechanical strength and wound and agglomerated in a hardened synthetic resin, in a single piece with the hub body.

So as to reduce the aerodynamic drag of the hub, the end of the hub body on the side opposite the mast may advantageously be covered with a cap secured to the hub body and having radial openings, evenly spaced apart in the circumferential direction around the periphery of the gap, in number equal to the number of openings in the hub body, and each of which is axially spaced from one of the openings of the hub body with which it forms a pair of openings separated by the reinforcing ring and intended to have passing therethrough the two branches of the forked fastening part of a blade of the rotor. Preferably, the radial openings of the cap, which is made from metal or from a composite material, are identical with each other and occupy positions substantially symmetrical with those of the openings in the hub body, with respect to the reinforcing ring.

In one embodiment facilitating manufacture in the form of a metal structure and connection of the cap to the hub body by directly fixing on the reinforcing ring, this latter is integral with the end of the hub body which is on the side opposite the mast. But it is also possible for the end part of the hub body which is opposite the mast to be extended axially beyond the reinforcing ring by a portion having indentations opening into the free edge of this portion and in number equal to the number of openings in the hub body, while being evenly spaced apart in the circumferential direction about the periphery of this portion, and each in axial correspondance with one of the openings of the hub body, and for the end indented portion of the hub body to be covered with a cap firmly secured to the hub body and having indentations opening in its edge turned towards the reinforcing ring, in number equal to the number of openings in the hub body, and disposed so that each of them forms with an indentation of the indented end portion of the hub body, an opening axially offset from the corresponding opening of the hub body and defining therewith a pair of openings whose two openings are intended to have each passing therethrough one of the two branches of the forked fastening part of a blade of the rotor.

So as to limit the flapping of the blades of the rotor on at least one side of their plane of rotation, the hub-mast comprises advantageously at least one central flapping stop, internal to the hub-mast and held in position by a support coaxial with the hub-mast and housed therein.

In one embodiment intended for equipping a main helicopter rotor, the central flapping stop comprises a rigid reciprocal ring, intended to form a lower stop limiting the downward flapping of the blades of the rotor, and mounted for lateral sliding in a circular U shaped housing opening radially outwardly, and fixed to the support at an axial level situated between the mast and the openings in the hub body. Thus, because of its arrangement internal to the hub-mast, the diameter and so the mass of the reciprocal ring are less than what they would be if this reciprocal ring were mounted about the hub-mast, as is the case in the state of the art.

In another embodiment, intended for equipping a rear helicopter rotor, the central flapping stop is an axial piece with circular cross section whose external lateral face has a concave sliding surface defined between two bearing surfaces against each of which, during extreme angular flapping movements of each blade from one side to the other of the rotational plane of the blades, is intended to come into abutment one of two nose pieces integral in movement with the root of the corresponding blade and between which is defined a sliding surface in the form of a convex spherical skull cap, for cooperating with the concave sliding surface of the flapping stop. In this example, as in the preceding one, the arrangement of the flapping stop device inside the hub-mast reduces the vulnerability of the rotor head.

In the case where the hub-mast is equipped with a cap, the support for the central flapping stop is advantageously widened out and carries the flapping stop at its narrowed end, whereas it is fixed to the cap by its widened end. But, with or without cap on the hub-mast, it is also possible for the support of the central flapping stop to comprise a substantially truncated cone shaped tubular surface bearing against the internal face of the mast and a tubular centering shell, also substantially in the form of a truncated cone, which is integral with the bearing surface and supports the flapping stop.

For facilitating coupling to the hub body of the internal ends of drag dampers associated with the blades of a rotor equipped with an integrated hub-mast in accordance with the invention, coupling fastenings, in number equal to the number of blades, are preferably carried by the reinforcing ring, each fastening projecting radially outwardly of the hub body and being carried by a portion of the reinforcing ring which is situated between two openings in the hub body. Each fastening may be formed by a clevis whose two branches form a single piece with the reinforcing ring, but it is also possible for each fastening to be formed by at least one piece added to the reinforcing ring. In this latter case, each fastening is advantageously fixed between two weight reducing recesses formed in this ring.

The invention also provides a rotor head, for a gyroplane rotor, of the type comprising an integrated hub-mast, intended to be rotated about the axis of the rotor by one of its parts forming a mast, and having a part forming a hub body, to which rotor blades are connected each by a forked two branch fastening part, and by means, on the one hand, of retaining and pivoting members having an external radial frame fixed to the hub body forming part and an internal radial frame fixed to the internal ends of the two branches and, on the other hand, of a drag damper whose ends are pivotally mounted by means of ball and socket joints one on the forked fastening part or the root of the corresponding blade and the other at a point of the hub body, and the rotor head of the invention is characterized in that the integrated hub-mast is a hub-mast such as presented above, the retaining and pivoting members are housed inside the hub body and are fixed bearing by their external frame against the internal face of the reinforcing ring or of the hub body at the level of the reinforcing ring, and one of the two branches of each forked fastening part passes through one of the openings in the hub body, the other branch passing possibly through a corresponding opening formed in a cap covering, as the case may be, the end of the hub body on the side opposite the mast. The opening in the end of the hub body on the side opposite the mast must be sufficient for introducing the retaining and pivoting members inside the hub body, and the internal cross section of this hub body, at the level of the reinforcing ring, must be sufficient for the arrangement of the retaining and pivoting members bearing by their external frame against the reinforcing ring or the internal face of the hub body at the level of the reinforcing ring, and for fixing the internal ends of the two branches of the fork fastening parts of the blades on the internal frames of the retaining and pivoting members, whence the advantage of giving a substantially convex shape to the hub body or to the whole formed by the assembly of the hub body with a corresponding cap. For this reason, even if the mast is in the shape of a truncated cone and converges towards its foot, the diameter of the hub-mast may still be sufficiently large for the stresses due to the torque or to the moment (induced respectively by the drag and flapping forces on the blades) to be small. This arrangement of the retaining and pivoting members in the hub body considerably reduces, in the hub-mast, the flexion and shearing stresses due to the alternate bending forces, at the level of this members, especially if these latter are formed, for each blade, by a stratified spherical stop fixed to the hub body so that its center of rotation is substantially in the thickness of the reinforcing ring. In addition, in constructions in which a composite material girdle surrounds the reinforcing ring, the centrifugal forces from the blades are taken over and balanced between said blades by the composite material girdle, working under traction, and so these forces exert practically no force on the hub-mast. Furthermore, since its diameter remains always relatively large, at least at the level of the hub body, the hub-mast is only subjected to small torsional stresses due to the drive torque, which is transmitted to the foot of the mast for driving the hub-mast in rotation. Moreover, it should be noted that the bending flapping forces pass directly from the retaining and pivoting members to the foot of the hub-mast, following a practically straight line path, and with moderate traction/compression forces.

Finally, the arrangement of the rotor head of the invention allows the retaining and pivoting members to be placed as close as possible to the axis of the rotor, since the central volume of the hub body forming part is not occupied by the material. This technical measure leads not only to reduced dimensions of the hub-mast, whence a mass and aerodynamic drag also reduced, but also to a lower vibratory energization level, for the flapping excentricity is smaller, by comparison with the results of the state of the art presented above.

So as to ensure a transfer of the forces and moments by direct bearing, the external frame of the retaining and pivoting members of each blade is advantageously shaped, outwardly, in the form of a stirrup which covers the reinforcing ring and holds the corresponding retaining and pivoting members in place inside the hub body.

In the case of a main rotor, if the central flapping stop of the integrated hub-mast is a reciprocal ring, in order to limit downward flapping of each blade by bearing against the reciprocal ring mounted inside the hub-mast, a rigid heel is advantageously firmly fixed to the lower branch of the forked fastening part of the corresponding blade by at least one fixing member simultaneously fixing the internal ends of the two branches of this forked fastening part to the internal frame of the corresponding retaining and pivoting members.

On the other hand, in the case of a rear rotor equipped with a hub-mast having a central flapping stop with concave sliding surface between two bearing surfaces, the internal frame of the retaining and pivoting members of each blade has, on its internal radial face, a recess whose bottom forms a sliding surface in the the form of a convex spherical skull cap between two nose pieces, the convex sliding surface and the two nose pieces cooperating respectively with the concave sliding surface and the two bearing surfaces of the central flapping stop so as to limit flapping of the corresponding blade on both sides of the rotational plane of the blades.

In addition, on the rotor head of the invention, the resilient return and drag damping member, provided for each blade of the rotor, is advantageously mounted outside the hub body, between one of the coupling fastenings carried by the reinforcing ring and another coupling fastening carried by the forked fastening part or the root of the corresponding blade. For each blade of the rotor, the rotor head of the invention also comprises a lever for controlling the angle of attack of the blade, and this lever is secured in movement with the corresponding forked fastening part.

When it is not required for the blades of the rotor to be able to "be folded back" in the plane of the rotor, it is advantageous, in a way known per se, for the forked fastening part of each blade to be directly intergrated with the root of this blade. On the other hand, if the blades must be able to fold back, and also in a way known per se, the forked fastening part of each blade is a substantially radial fastening sleeve shaped, at its internal end, in the form of a clevis whose two branches are fixed to the internal frame of the corresponding retaining and pivoting members and also shaped, at its external end, as a clevis for fixing to the root of the corresponding blade by two shafts substantially parallel to the axis of rotation of the rotor and one of which is removable, for allowing the blade to be folded back by pivoting about the other shaft.

Whatever the configuration adopted, it can be seen that the rotor head of the invention is formed from a small number of pieces all having relatively simple shapes adapted to the forces to be withstood, which allows the mass and the manufacturing and maintenance costs of this rotor head to be reduced, while improving its stability and reducing the vibrations, which is a factor of safety and reliability. Since, moreover, the dimensions of a rotor head of the invention are limited because the retaining and pivoting members and the flapping stop device are housed in the integrated hub-mast, the aerodynamic drag is reduced and the whole of these advantageous results contribute in increasing the performances of the helicopter equipped with such a rotor head, not only in so far as its main or lift rotor or rotors are concerned, but also in so far as its rear or anti-torque rotor is concerned.

Figure 7:
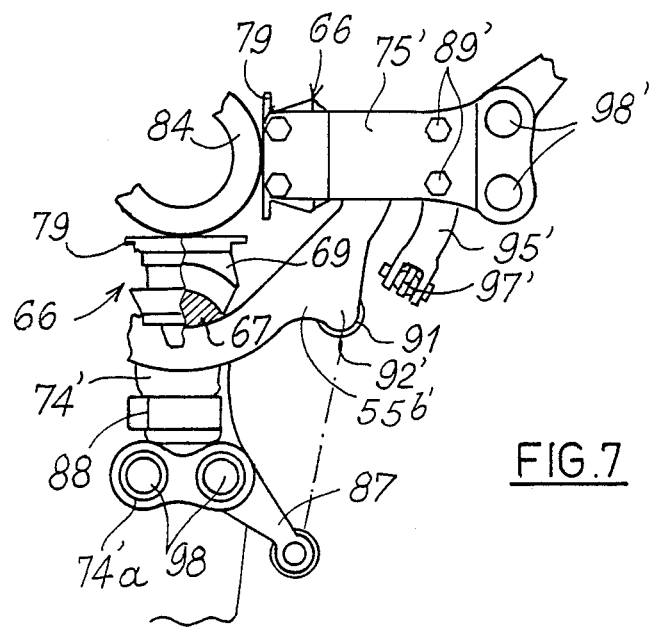
Figure 6:
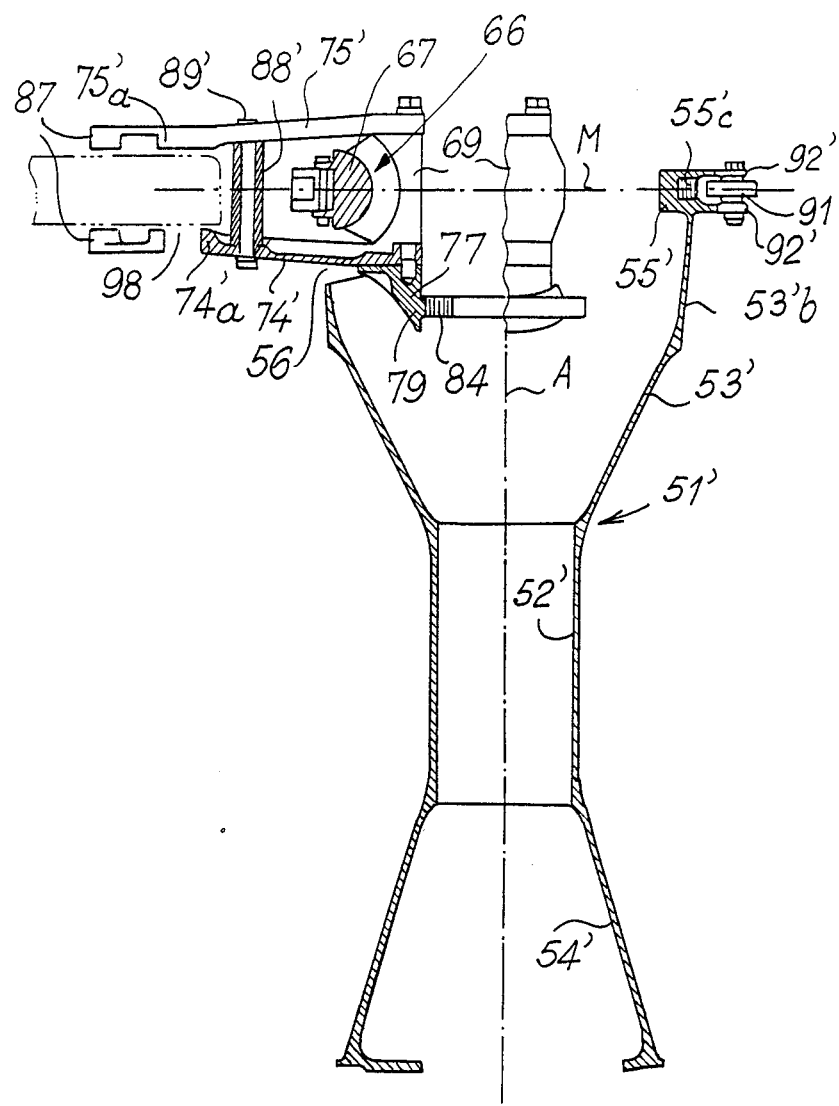

The invention will be better understood from the following description of particular embodiments, described by way of non limiting examples, with reference to the accompanying drawings in which:

FIG. 1 is a schematical view in axial section of a three blade rear helicopter rotor head, equipped with a first example of an integrated hub-mast associated with three non foldable blades, FIG. 2 is a partial side view of the hub-mast of the rotor head shown in FIG. 1, FIG. 3 is a schematical end elevational view of the rotor head of FIG. 1 after removal of the cap covering the hub body, FIG. 4 is a schematical view in axial half section in the left hand half view and partly in side elevation and in offset section in the right hand half view, for a main four blade helicopter rotor head equipped with a second example of an integrated hub-mast associated with four foldable blades, FIG. 5 is a schematical partial view partly in section and partially in plan of the rotor head of FIG. 4, FIG. 6 is a view similar to FIG. 4 for another main four blade rotor head equipped with a third example of an integrated hub-mast, and FIG. 7 is a view similar to FIG. 5 for the rotor head shown in FIG. 6.

Referring to FIG. 1, the rear rotor head comprises an integrated hub-mast 1, essentialy formed of a tubular single block body, with symmetry of revolution about an axis A, and whose internal part (with respect to the longitudinal plane of symmetry of the helicopter, not shown, but perpendicular to the axis A on the left of FIG. 1) forms a tubular mast 2, whereas its external part forms a tubular hub body 3. The mast-forming part 2 has a general cylindrical external shape with circular section, and its internal axial end is shaped as a foot 4 formed by an annualr flange of rectangular cross section projecting radially outwardly of mast 2. By means of this foot 4, mast 2 is fixed by a ring of bolts (not shown) to a tubular member (also not shown) for fitting on an auxiliary gear box, mounted at the rear of the helicopter for rotating the hub-mast 1 and so the rotor about axis A, which is also the axis of rotation of the rotor. By its external end, mast 2 is connected to the hub body-forming part 3 and is extended directly by this part 3, which has a general external substantially truncated cone shape and widens from its internal axial end, adjacent mast 2, to its external free axial end locally and peripherally thickened in the form of a circular reinforcing ring 5, with rectangular cross section, projecting radially outwardly of the hub body 3 and whose radial and external axial edge is chamfered. The reinforcing ring 5 thus surrounds the circular opening of the external free end of the hub body 3. The single block tubular body formed by mast 2 with its foot 4 and by the hub body 3 with its ring 5 is made from metal, for example from steel or titanium, and it is formed from a forged or die stamped blank. Identical radial openings 6, in number equal to the number of blades of the rotor, so three openings 6 in this example, are formed in the portion of the hub body 3 which is directly adjacent the reinforcing ring 5 and are evenly spaced apart in the circumferential direction about the periphery of this portion. Each opening 6 has a substantially half moon or very rounded haricot bean shape, whose general concavity is turned towards the reinforcing ring 5. In its central part, the external axial edge 7 of each opening 6 is rectilinear and is defined by the internal axial face of ring 5. In addition, the ends in the circumferential direction of all the openings 6 are in the same transverse plane perpendicular to axis A. The external axial end of the hub body 3, having ring 5, is covered by a cap 8 formed of a substantially truncated cone shaped wall 9 and a circular cupola 10, slightly dished with its concavity towards the hub body 3. The cupola 10, intended to reduce the aerodynamic drag of the rotor, especially at the level of the hub and of the root of the blades, extends radially well beyond the side wall 9 which has, on its small base side, in an external axial position, a peripheral flange 11, turned down radially inwardly and against the external face of which the cupola 10 is fixed by a screw-nut assembly ring with axes 12. On its large base side, the side wall 9 of the cap is coaxially fixed to the hub body 3 while being fixed to ring 5. For this, the side wall 9 has three flanges 13 in the form of an arc of a circle, identical and bent back radially outwardly from the large base of wall 9 and evenly spaced apart about the periphery of this large base, while being each separated from the other two flanges by an indentation 15 formed in wall 9 and having a shape substantially symmetrical with that of opening 6 with respect to the transverse median plane M of ring 5. Cap 8 is fixed to the hub body 3 by screw-nut assemblies with axes 14 connecting the three flanges 13 to ring 5, in a position such that each of the three radial indentations 15, identical to each other and rounded, with general concavity turned towards the ring 5, is axially opposite one of the three identical openings 6, while being separated therefrom by the thickness of the ring 5. The external axial face of ring 5 thus defines with the three indentations of the wall 9 three radial openings 15 each of which is substantially symmetrical with one of the three openings 6 with respect to ring 5. The hub-mast 1 with its cap 8 thus has three pairs of radial openings 6-15 evenly spaced apart about its periphery, the two openings 6, 15 of each pair being spaced axially on each side of ring 5 and having their general concavity turned towards each other, the opening 6 being an internal axial opening, formed in the hub body 3, whereas opening 15 is an external axial opening formed in cap 8.

Each of the three blades of the rotor is connected to the hub body-forming part 3 by retaining and pivoting members. These latter may advantageously comprise at least one stratified spherical stop housed in the hub body 3. These members allow the blade to be mounted on hub 3 for pivoting about its three flapping, drag and change or pitch axes, which intersect at the swivel joint point determined by the center of rotation of the corresponding stratified spherical stop. This member is a component henceforth well known, comprising essentially a central stratified part, formed of a stack of spherical skull cap shaped layers alternatively rigid, for example made from a metal material, and from a resilient material, such as a synthetic rubber, for example silicone elastomer, this central stratified part being vulcanized between two rigid frames, for example made from metal.

In the embodiment shown in FIGS. 1 and 3, each spherical stratified stop 16 is applied against the internal radial face of the reinforcing ring 5, between the two openings 6 and 15 of a pair of corresponding openings, and stop 16 is fixed against ring 5 by its external radial frame 17 formed, in its external part, as an outwardly open stirrup so as to partially straddle the internal and external axial faces of ring 5, which ensures the transfer of forces and moments to ring 5 by simple bearing. By its internal radial part, of a convex shape, the external frame 17 is integral with the external concave face of the central stratified part 18 of the stop 16, whereas the central stratified part 18 is integral, by its convex internal face, with the radial external concave part of the internal frame 19.

The spherical stop 16 is disposed under the cap 8 and inside the opening of the external axial end of the hub body 3, so that its center of rotation is situated in the median plane M of ring 5 and in the thickness thereof, in the vicinity of its external radial face, and stop 16 is held in position by means of a bolt 20 introduced parallel to axis A and from the outside of hub body 3 into aligned holes pierced in ring 5 and in the two branches of the stirrup of the external frame 17, a locked or pinned nut 21 being screwed and retained on the threaded end of the shank of bolt 20 which projects from the side of opening 6.

The root of each blade 22 is shaped as a forked fastening part 23 with two axially spaced branches, the internal branch 24 of which passes through the corresponding internal opening 6, and the external branch 25 of which passes through the corresponding external opening 15, the internal radial ends of the two branches 24 and 25 being fixed against the internal frame 19 of the spherical stop 16 by a bolt 26, which passes axially from the outside through aligned holes pierced in the internal frame 19 and in the internal ends of branches 24 and 25, the head of bolt 26 bearing against the external axial face of the external branch 25, and a nut 27 being screwed and retained by a pin on the threaded end of the shank of bolt 26 which projects from the internal axial face of the internal radial end of the internal branch 24.

The internal frame 19 connecting the forked root 23 of blade 22 to the spherical stop 16 also serves as spacer holding the two branches 24 and 25 spaced apart with constant spacing.

For limiting the flapping of blade 22 on each side of the rotational plane of the rotor, merging substantially with the transverse plane M, a recess whose bottom forms a sliding surface 28 in the form of a convex spherical skull cap is formed in the internal radial face of the internal frame 19 of the stratified spherical stop 16. This convex sliding surface 28 is defined on this internal face of frame 19 between two nose pieces 29 each having a slanted bearing face turned towards the intersection of the axis of A with the transverse plane M. The sliding surface 28 and the two nose pieces 29 cooperate with a central flapping stop 30, which is mounted coaxially inside the hub-mast 1 by means of a widened out tubular support 31. By its widest external axial end this support 31 is fixed against the internal axial face of the peripheral flange 11 of the side wall 9 of cap 8, by means of screw-nut assemblies with axes 12 which also fix the disk 10 to the lateral wall 9, whereas the narrowest internal axial end of support 31 is integral with the flapping stop 30. This latter is a tubular piece with circular cross section which is surrounded by a self lubricating bearing 32, in the form of a sleeve whose external lateral or radial face forms a concave sliding surface 33, with curvature complementary to that of the convex surface 28. Bearing 32 is housed in a circular recess formed in the external radial face of the tubular piece, between two slanted annular bearing surfaces 34 turned radially outwardly and each towards one of the two nose pieces 29. The flapping stop device thus formed, which is also internal to the hub-mast 1, is such that for the extreme angular flapping movements allowed for blade 22 on one side or the other of the rotational plane of the rotor, one of the nose pieces 29 comes into abutment against the facing bearing surface 34 on the central flapping stop 30, after sliding of the convex surface 28 over the concave surface 33 of the bearing 32 of this central stop 30.

The drag damping of each blade 22 and the resilient return thereof to its neutral axis are provided by a member external to the hub-mast 1 and disposed laterally between the reinforcing ring 5 of the hub body 3 and the blade root 23. This member, called drag daper, resilient return drag strut with incorporated damping or even frequency adapter, is a member 35 formed in this example from coaxial tubes between which is incorporated a cylindrical sleeve made from a visco-elastic material, but this member 35 could by a hydraulic member or else a member formed of an alternating stack of rigid plates and plates of visco-elastic material. This member 35 is coupled, at its ends, by ball joints on the one hand to the blade root 23 and on the other to the reinforcing ring 5. The ball and socket joint 36 of the end in the external radial position of damper 35 is mounted between the two parallel wings of a fastening clevis 37 projecting with respect to the blade root 23 on the trailing edge side of the corresponding blade 22, and carried laterally by a spacer 38 engaged between the two branches 24 and 25 of the forked fastening root of the corresponding blade 22, at the level of the external radial ends of these branches 24 and 25, to which the spacer 38 is fixed by two bolts 39 and locked or pinned nut 40 assemblies, whose bolts 39 pass through facing holes pierced in branches 24 and 25 and in the spacer 38. The ball and socket joint 41 of the end in the internal radial position of the resilient return and drag damping member 35 is mounted between two triangular and parallel fastening fittings 42, fixed one against the external axial face and the other against the internal axial face of a ring portion 5 situated between two pairs of openings 6–15, and at the level of which a flat 43 is machined in the external radial face of ring 5. The two fittings 42 of the same fastener are fixed to ring 5 by two screw-nut assemblies with axis 14 which simultaneously secure the flanges 13 of wall 9 of cap 9 to ring 5, in a portion also situated between two weight reducing recesses 44 formed in the internal and external axial faces of the part forming the web of ring 5, as shown in FIG. 3, which shows that the bolts 20 for fixing to ring 5 the stirrup of the external frame 17 of each spherical stratified stop 16 also passes through a ring portion 5 situated between two weight reducing recesses 44. The arrangement of clevis 37 and the fastening fittings 42 give to each resilient return and damping member 35 an orientation substantially tangential to the reinforcing ring 5. On the leading edge side of each blade 22, the blade root 23 also comprises a lever 45 for controlling the angle of attack of the blade. This lever 45 extends the spacer 38 on the side opposite clevis 37 and ends in a clevis 46 in which is pivotally mounted, by means of a ball and socket joint, one end of a link 47 for controlling the pitch of the corresponding blade 22. It should be noted that the pitch control link 47 may be replaced by a connecting rod assembly at least partially housed in the hub-mast 1, while taking advantage of the tubular structure of this latter, and thus improving the protection of the different components of the rotor head.

On the rear rotor head thus formed, the reinforcing ring 5 takes up under traction the centrifugal forces exerted on blades 22 for balancing them with each other, these centrifugal forces practically not urging the hub-mast 1 itself. The alternate bending forces at the level of the spherical stop 16 induce in the hub-mast 1 relatively small flexion and shearing stresses, and particularly the flapping forces transferred to the spherical stops 16 pass from these latter to ring 5 and from this latter to the hub-mast 1 directly to its foot 4, with moderate traction/compression stresses. This rotor head arrangement allows the spherical stop 16 as well as the central flapping stop 30 to be mounted close to the axis A of the rotor, without hindering the movements of the blades 22 with respect to the hub-mast 1 about the centers of rotation of the spherical stops 16, because of the passage and deflection of the internal 24 and external 25 branches in the internal 6 and external 15 openings formed respectively in the hub body 3 and in cap 8. This arrangement leads then to a reduced space requirement, and to a lesser weight as well as to a lower aerodynamic drag and to a low level of vibratory energization because the flapping excentricity is small.

The second rotor head example shown in FIGS. 4 and 5 is intended for a main four blade helicopter rotor, and has numerous characteristics in common with the rotor head described above with reference to FIGS. 1 to 3, so that the following description relates mainly to the differences between these two rotor head examples.

The rotor head of FIGS. 4 and 5 comprises an integrated hub-mast 51, comprising a lower tubular part with substantially vertical axis A, forming a mast 52 of substantially cylindrical shape with circular section, whose external side surface has cylindrical surfaces for connection to the upper part of the main gear box of the helicopter, for transferring to the fuselage of this latter the forces and moments coming from the rotor, and the lower end of mast 52 is formed as a splined foot 54, by which the hub-mast 51 is embedded in the main gear box and driven in rotation about axis A. The hub-mast 51 also comprises an upper part forming a hub body 53, which is also tubular and extends mast 52, coaxially to this latter. In this example, the hub body 53 is formed of two truncated cone shaped parts 53a and 53b secured together and superimposed end to end, the lower truncated cone shaped part 53a being connected by its small base at its lower end to the upper end of mast 52, and having a taper angle greater than that of the upper truncated cone shaped part 53b which is connected by its small base, at its lower end, to the large base at the upper end of the lower truncated cone shaped part 53a, so that the hub body 53 widens out from its lower end adjacent mast 52 as far as its free upper end while presenting a general external substantially convex shape. The upper free end of the hub body 53 is locally and peripherally thickened to form a reinforcing ring 55, of rectangular cross section, and the hub body 53 with its ring 55 and mast 52 with its foot 54 are formed by a single block metal piece made from steel or titanium formed from a forged or die stamped blank. But, in this example, this single block piece does not have a symmetry of revolution about axis A, for ring 55, which surrounds the opening of a free end of hub body 53 is not circular but has, seen in a plane view (see FIG. 5), a shape substantially in the form of a pseudo-regular polygon, with small equal sides 55a, slightly convex, alternating with large equal rectinlinear sides 55b, and in number equal to the number of blades of the rotor. In this four blade rotor example, ring 55 has substantially a square shape seen from the top, defined by four large sides 55b connected together by four rounded apices each formed by one of the small convex sides 55a (one of which is visible in FIG. 5), these latter corresponding to the portions of ring 5 on which are retained the stratified spherical stops 56 housed in the opening of the upper end of the hub body 53 and forming the members for retaining and pivoting the blades on the hub-mast 51. The small sides 55a of ring 55 project radially outwardly with respect to the adjacent upper end of the hub body 53 (shown with broken lines in FIG. 5); whereas the large sides 55b essentially project radially inwardly. With this particular form, ring 55 may be given great rigidity. In addition, ring 55 has a peripheral groove, of rectangular or square section, which opens into its external radial face and a girdle 55c made from composite materials is housed in this groove. This girdle 55 is formed by winding, in the groove of ring 55, unidirectional rovings of carbon or KEVLAR preimpregnated with an epoxy resin then by curing the resin which is hardened. This girdle 55c, like the groove which houses it and ring 55, is symmetrical with respect to the median transverse plane M of the ring, which is perpendicular to the axis A, and it provided the necessary redundancy in the case of breakage of the hub body 53 following a crack or ballistic impact, for taking up the centrifugal forces. Girdle 55c, thus gives to the hub-mast 51 a good "fail-safe" character resisting the notch effect. Four openings 56, whose form and function correspond to those of openings 6 in the preceding example, are formed in the upper part 53b of the hub body, and each directly under one of the four small sides 55a of ring 55. In this example, contrary to the preceding example, ring 55 and the upper end of the hub body 53 are not covered by the cap. On the other hand, as in the preceding example, each blade of the rotor is connected to the hub body 53 by a spherical stratified stop 66, whose swivel center is situated in the thickness of firdle 55c and in the plane M. Each stop 66 is applied against the internal radial face of a small side 55a of ring 55, and stop 66 is fixed to ring 55 by its external radial frame 67, shaped outwardly as a stirrup which partially straddles the upper and lower faces of said small side 55a of ring 55, while engaging under this latter in the corresponding opening 56, and the external frame 67 is retained in position by two bolt 70 and pinned or locked nut 71 assemblies, mounted side by side, for which the bolt 70 is introduced parallel to axis A and from top to bottom in aligned holes pierced in the two branches of the stirrup of frame 67 and in ring 55 without passing through the girdle 55c, nut 71 being screwed on the lower threaded end of the shank of the bolt which projects towards the corresponding opening 56.

Since this rotor head example is intended for a main rotor with blades foldable by pivoting substantially in the plane of the rotor, merging substantially with the transverse plane M, the member for connecting each blade to the internal frame 69 of the corresponding stratified spherical stop 66 is not, as in the precding example, a forked fastening part integrated with the blade root, but the root 72 of each blade (shown with broken lines in FIG. 4) is connected to the corresponding stratified stop 66 by a sort of radial sleeve 73, open laterally and whose internal and external end parts are shaped as clevises with two branches. In a very simple construction, this connecting member 73 comprises two substantially horizontal radial plates, disposed one above the other and symmetrical with each other with respect to the plane M, the lower plate 74 passing through the corresponding opening 46, whereas the upper plate 75 passes above ring 55 and stop 66. The two plates 74 and 75 are fixed by their internal ends to the internal frame 69 of the stop 66, by means of two bolts 76 mounted side by side and which each pass, parallel to axis A and from top to bottom, through aligned holes pierced in the internal frame 69, which also serves as spacer for spacing the two branches 74 and 75, and in these internal ends of plates 74 and 75, the heads of bolts 76 bearing against the upper face of the upper plate 75 and the threaded ends of the shanks of bolts 76 being screwed into a rigid heel support 77 which is thus fixed against the lower face of the internal end of the lower plate 74. The blade root 72 is engaged between double bearings 74a and 75a, carried by the external ends of the two plates 74 and 75, and this blade root is retained therebetween by two shafts 98, disposed side by side and perpendicularly to the plane M, these shafts 98 passing through the aligned double bearing 74a and 75a as well as holes aligned in the blade root 72, and one of the two shafts 98 being removable for allowing the corresponding blade to pivot about the other shaft.

For limiting the downward deflection of each blade, at low or zero speeds of rotation of the rotor, the supports 77 each have a rigid heel 79, in the shape of an arc of a circle, which is bolted to its support 77 so as to have a stop surface turned towards axis A and which is perpendicular to the longitudinal axis of the corresponding blade. This heel 79 cooperates with a central flapping stop 80 made up of a reciprocal ring 84 made from composite materials with carbon fibers agglomerated in a hardened resin and girdled with a cemented steel band. This reciprocal ring 84 is mounted for lateral or radial sliding in a U shaped housing opening to the outside and formed by bolting an upper annular member 83, having cross section in the shape of a recumbant L, to a lower annular member 82, of T cross section, itself fitted in and retained by screws (not shown) in the cylindrical upper part 81a of a composite or metal support 81. This latter has a truncated cone shaped shell 81b, diverging downwardly which is extended by a truncated cone shaped centering surface 81c, converging downwardly and by which the support 81 is applied against the internal face of the lower part 53a of the body of hub 53. Support 81 extends coaxially inside the hub body 53 over a sufficient distance for the U shaped housing 82-83 and the reciprocal ring 84 to be slightly below the level of openings 56, so that the heels 79 of the blades come to bear against the reciprocal ring 84, as soon as the blades are no longer sufficiently acted on by the centrifugal force and pivot downwardly about the centers of rotation of the spherical stop 66, through a predetermined angle. The lower stop device inside the hub body 53 and formed by the reciprocal ring 84, the housing 82-83 and support 81 is dimensioned for absorbing the static moment of the blades when the rotor stops. A resilient drag return and damping member 85, of the same type as member 35 provided for each blade in the rotor head example described with reference to FIGS. 1 to 3, but dimensioned so as to be suitable for a main rotor, is disposed laterally between the root of each blade and a portion of the reinforcing ring 55 which is situated between the radial connecting member 73 of the corresponding blade and the connecting member of the immediately following blade, considering the direction of rotation of the rotor. This member 95 is coupled by a ball and socket joint 86, at its end in an external radial position, directly to a fastening fixed to the blade root, on the trailing edge side of the corresponding blade, and a ball and socket joint 91, at its end in an internal radial position, is retained between the two branches of a fastening clevis 92 bolted to a lug 93 projecting radially outwardly from ring 55, at the level of the middle of the corresponding large side 55b of this latter, and forming a single piece with this ring 55.

Similarly to what was described above in the first example, with reference to FIGS. 1 to 3; another spacer 88 is retained by two bolts 89 mounted side by side between the external radial parts of the two plates 74 to 75 of each radial connecting member 73 and this spacer 88 is extended laterally, on the leading edge side of the corresponding blade, by an angle of attack control lever 95 whose end is coupled by a ball and socket joint 96 to the upper end of a link 97 controlling the pitch of the corresponding blade. Such a rotor head has advantages of the same kind as those mentioned above with respect to the example described with reference to FIGS. 1 to 3. These advantages are principally that the ring 55 and its girdle 55c, under traction, take up the centrifugal forces exerted on the blades for balancing them out, the low forces exerted on the hub-mast 51, because of the small flexion and shearing stresses induced by the alternate bending forces at the level of the stratified stops 66 and because of the transfer the vertical flapping forces to stops 66, and from these latter to ring 55 and to girdle 55c, then directed to the foot 54 of mast 52, with moderate traction/compression stresses. These advantages are also the reduction of the space required, the weight, the aerodynamic drag, the vibratory level and the vulnerability becauce of the arrangement of the stratified stops 66 and of the flapping stop device in the hub-mast 51, close to axis A.

Mounting of the rotor is simple: after fitting the hub-mast 51 in the main gear box, with the reciprocal ring 84 already positioned in its housing 82-83, itself already fixed to its support 81, is introduced with these latter into the hub-mast 51 and support 81 is fixed in position. Then the spherical stops 66 are successively introduced into the hub body forming part 51 through the opening of sufficient diameter defined by ring 55 at the upper end of the hub body and they are fixed in position against ring 55. Then the radial connecting members 73 are presented one by one and, for each one, the lower plate 74 is engaged in the corresponding opening 56. Then the internal ends of plates 74 and 75 are bolted to the internal frame 69 of the corresponding spherical stratified stop 66, by means of two bolts 76 which are screwed into the corresponding support 77. The blades are then presented one by one and the root of each is fixed to the corresponding connecting member 73 by the two shafts 98. Then the resilient drag return and damping members 85 are coupled between the hub-mast 51 and the roots of the blades and finally the angle of attack control levers 95 to the corresponding control links 97.

Dismantling operations are carried out in the reverse order.

The third rotor head example, shown in FIGS. 6 and 7, is also intended for a main four blade rotor with foldable blades and it is only distinguished from the embodiment shown in FIGS. 4 and 5 by four main differences, which are presented below.

A first difference is that the part forming a tubular and cylindrical mast 52' of the hub-mast 51' is extended at its lower end by a tubular foot 54' which is substantially in the shape of a truncated cone and opens out downwardly, so that the diameter of the foot of the hub-mast may be adapted to a rotary mounting and drive device having at least one bearing whose chosen size is relatively large without being prohibitive.

The second difference is that the upper part 53'b of the hub body 53' is very little widened out and is practically cylindrical with circular section, which allows the stratified spherical stops 66 to be brought even closer to the axis A, while keeping a sufficient opening at the upper end of the hub-mast 51' for introducing therein the reciprocal ring 84 with its U shaped housing and its support (not shown) and stratisfied spherical stops 66.

A third difference is that the coupling ball and socket joint 91 of the internal radial end of each resilient drag return and damping member is retained in a fastening clevis whose two branches are two lugs 92' triangular in shape, parallel to each other and one above the other, which project radially outwardly of the reinfocing ring 55', from the middle of a large side 55'b thereof, the upper and lower lugs 92' forming a single piece respectively with the upper and lower edges of ring 55' which border the groove of this latter in which is housed the composite girdle 55'c.

The fourth difference is that the coupling ball joint of the external radial end of the resilient drag return and damping member is retained between two fittings 87 substantially parallel to each other, which form a fastening clevis by their free end and which each form a single piece with one of the two lower 74' and upper 75' plates of the radial member connecting the corresponding plate to the hub body 53'. Each fitting 87 extends both radially outwardly and towards the trailing edge of the corresponding blade, from the double bearing 74'a or 75'a at the external radial end of the corresponding plate 74' or 75'.

Finally, another difference of lesser importance is that the angle of attack control lever 95', still integrally secured to the spacer 88' fixed by bolts 89' between the two plates 74' and 75', and projecting from the leading edge side of the corresponding blade, is in addition curved towards ring 55' so as to bring the pitch control links 97' even closer to the hub body 53' and simultaneously to bring the pivoting point of these links on levers 95' closer to the flapping axes of the corresponding blades, which reduces the couplings between the flapping and the angle of attack controls of the blades.

We claim:

1. An integrated hub-mast for a gyroplane rotor having a plurality of blades, the hub-mast comprising:
   a hollow-tubular hub body having an axis of rotation (A),
   a tubular mast forming portion coaxially firmly secured to one end of the hub body,
   a foot coaxially formed on one end of the mast forming portion opposite the hub body,
   the hub body widening out radially from said one end thereof and being pierced with openings equal in number to the plurality of blades evenly spaced apart in the circumferential direction about the periphery of hub body,
   a reinforcing ring fixed to the other end of the hub body in a plane (M) of rotation of the plurality of blades and having a plurality of coupling fastenings, the ring taking up centrifugal forces introduced into the hub-mast from rotation of the blades,
   a forked fastening part for each one of the plurality of blades, each forked part having two branches, one of the two branches passing through one of the openings in the hub body under the reinfrocing ring, the other branch passing over the reinforcing ring,
   a plurality of stratified spherical stops, one for each blade, housed inside the hub body, each spherical stop having a radially external frame fixed against an internal face of the reinforcing ring such that a center of rotation of the spherical stop is substantially situated in the reinforcing ring and a radially internal frame, radially internal ends of the two branches of one forked fastening part being fixed to the internal frame of one spherical stop,
   a plurality of resilient drag return and damping members, one for each blade, each member being connected to one of the coupling fastenings of the reinforcing ring and being operatively asociated with one of the blades,
   one central flapping stop internal to the hub body for limiting flapping of the blades on one side at least of the plane (M) of rotation of the blades, and
   a support coaxially housed in the hub body supporting the central flapping stop.

2. The integrated hub-mast according to claim 1 wherein the openings of the hub body are identical with each other and have substantially a shape with a concavity turned towards the reinforcing ring, the ends in the circumferential direction of the openings being substantially in a transverse plane perpendicular to the axis (A) of the hub-mast.

3. The integrated hub-mast according to claim 1, wherein the reinforcing ring and the hub body are formed by a single block piece on which the reinforcing ring is formed by a local and peripheral increase of the thickness of the hub-mast.

4. The integrated hub-mast according to claim 1, wherein the reinforcing ring has a peripheral housing opening radially outwardly and said hub-mast further includes a composite material girdle with unidirectional high mechanical strength synthetic or mineral fibers coiled and agglomerated by means of a synthetic and hardened resin housed in said peripheral housing opening.

5. The integrated hub-mast according to claim 1, wherein the reinforcing ring is a circular ring projecting radially outwardly of the hub body.

6. The integrated hub-mast according to claim 5, wherein the hub body and the mast are formed by a single tubular piece with symmetry of revolution.

7. The integrated hub-mast according to claim 1, wherein the reinforcing ring has a substantially polygonal shape and projects radially outwardly of the hub body substantially at the level of portions of the reinforcing ring situated axially opposite the openings in the hub body and, inwardly of the hub body substantially at the level of portions of the reinforcing ring situated axially between two adjacent openings in the hub body.

8. The integrated hub-mast according to claim 1, wherein the mast forming portion, the hub body and the reinforcing ring are made from metal and the reinforcing ring has a section substantially in the shape of a rectangular quadrilateral.

9. The integrated hub-mast according to claim 1, further comprising a cap covering the end of the hub body on the side opposite the mast, is the cap being fixed to the hub body and having radial openings evenly spaced apart in the circumferential direction about the periphery of the cap in the number equal to the number of openings in the hub body, and each cap opening being axially spaced from one of the openings in the hub body with which it forms a pair of openings separated by the reinforcing ring and having passing therethrough the two branches of the forked fastening part of the blade of the rotor.

10. The integrated hub-mast according to claim 9, wherein the radial openings of the cap are identical with each other and occupy positions substantially symmetrical with those of the openings in the hub body with respect to the reinforcing ring.

11. The integrated hub-mast according to claim 1, wherein the reinforcing ring is secured to the end of the hub body which is on the side opposite the mast.

12. The integrated hub-mast according to claim 1, wherein the end of the hub body which is opposite the mast is extended axially beyond the reinforcing ring by a portion having indentations opening into the free edge of the portion and in number equal to the number of openings in the hub body, while being regularly spaced apart in the circumferential direction about the periphery of this portion, each indentation being in axial correspondence with one of the openings in the hub body, and further comprising a cap fixed to the hub body and covering the indented end portion of the hub body, the cap having indentations opening in its edge turned towards the reinforcing ring, in number equal to the number of openings in the hub body, and disposed so that each of them forms with one indentation of the indented end portion of the hub body an opening axially offset from the corresponding opening of the hub body and defining therewith a pair of openings in which the two openings are transversed each one by one of the two branches of the forked fastening part of one rotor blade.

13. The integrated hub-mast according to claim 1 intended for equipping a helicopter rear rotor, wherein the central flapping stop is an axial piece of circular cross section whose external lateral face has a concave sliding surface defined between two bearing surfaces against each of which, during the endmost angular flapping movements of each blade on one side or on the other of the plane of rotation of the blades (M), one of two nose pieces abuts, said nose pieces being interlocked for movement with the root of the corresponding blade and between which is defined a convex spherical skull cap shaped sliding surface cooperating with the concave sliding surface of the flapping stop.

14. The integrated hub-mast according to claim 1 for equipping a main helicopter rotor, wherein the central flapping stop has a rigid reciprocal ring for forming a lower stop limiting the downward flapping of the blades of the rotor, said ring being mounted for lateral sliding in a circular U shaped housing opening radially outwardly and fixed to the support at an axial level situated between the mast and the openings in the hub body.

15. The integrated hub-mast according to claim 13 wherein the support of the central flapping stop is widened out and carries the flapping stop at its narrowed end and is fixed to the cap by its widened end.

16. The integrated hub-mast according to claim 15, wherein the support of the central flapping stop has a tubular substantially truncated cone shaped surface bearing against the internal face of the hub body and a tubular centering shell, also substantially in the shape of a truncated cone, which is integral with the bearing surface and supports the flapping stop.

17. The integrated hub-mast according to claim 1, wherein each coupling fastening of the reinforcing ring projects radially outwardly of the hub body and is carried by a portion of the reinforcing ring situated between two adjacent openings in the hub body.

18. The integrated hub-mast according to claim 17, characterized in that each coupling fastening is formed by a clevis whose two branches form a single piece with the reinforcing ring.

19. The integrated hub-mast according to claim 17, characterized in that each coupling fastening is a piece fixed to the reinforcing ring between two weight reducing recesses formed in the ring.

20. The integrated hub-mast according to claim 1, wherein the external frame of the stratified spherical stop of each blade is shaped, towards the outside, as a stirrup which covers the reinforcing ring and holds the corresponding spherical stop in position inside the hub body while being bolted to the reinforcing ring.

21. The integrated hub-mast according to claim 14, wherein a rigid heel for coming into abutment against the reciprocal ring of the central flapping stop, so as to limit the downward flapping of the blade, is integrally secured to one of the branches of the forked fastening part of the corresponding blade by at least one fixing member securing simultaneously the internal ends of the two branches of the forked fastening part to the internal frame of the corresponding spherical stops.

22. The integrated hub-mast according to claim 13, wherein the internal frame of the stratified spherical stop of each blade has, on its internal radial face, a recess whose bottom forms said sliding surface in the form of a convex spherical skull cap defined between said two nose pieces, the convex sliding surface and the two nose pieces cooperating respectively with the concave sliding surface and the two bearing surfaces of the central flapping stop, so as to limit the flapping of the corresponding blade on both sides of the plane of rotation (M) of the blades.

23. The integrated hub-mast according to claim 1, further comprising, for each blade of the rotor, a lever for controlling the angle of attack of the blade which is interlocked for movement with the corresponding forked fastening part.

24. The integrated hub-mast according to claim 1, wherein the forked fastening part of each blade is integrated with the blade root.

25. The integrated hub-mast according to claim 1, wherein the forked fastening part of each blade is substantially radial fastening sleeve, shaped at its internal end as a clevis whose two branches are fixed to the internal frame of the corresponding spherical stop and shaped at its external end as a clevis for fixing to the root of the corresponding blade by two shafts substantially parallel to the axis of rotation of the rotor, one of the two shafts being removable so as to allow the blade to be folded back by pivoting about the other of the two shafts.

* * * * *